S. D. MASTER.
TROLLEY WHEEL.
APPLICATION FILED JULY 2, 1920. RENEWED JUNE 10, 1921.
1,385,881.
Patented July 26, 1921.
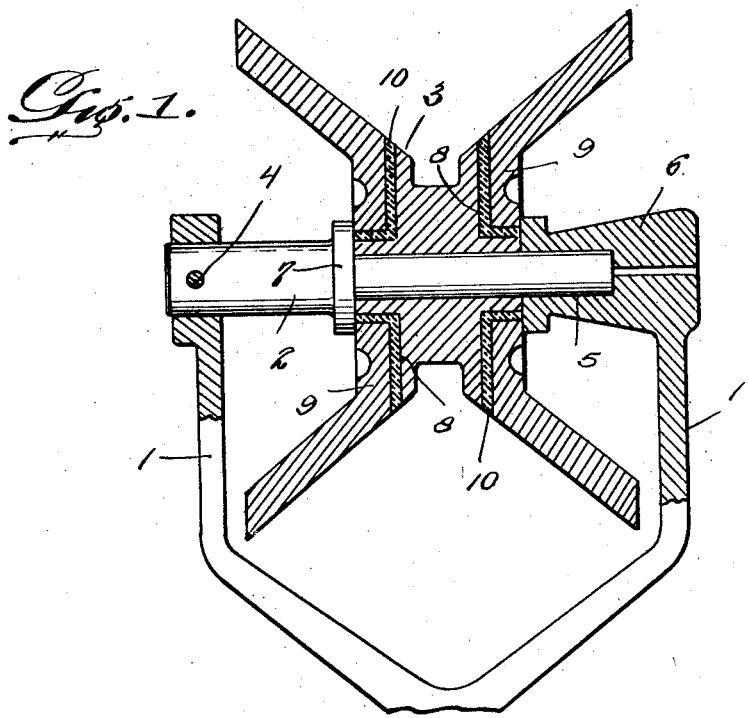
Fig. 1.
Fig. 3.
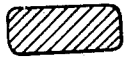
S. D. Master.
INVENTOR
BY Victor J. Evans
ATTORNEY
F. L. Fox,
L. B. Middleton
WITNESSES:

S. D. MASTER.
TROLLEY WHEEL.
APPLICATION FILED JULY 2, 1920. RENEWED JUNE 10, 1921.
1,385,881.
Patented July 26, 1921.
2 SHEETS—SHEET 2.
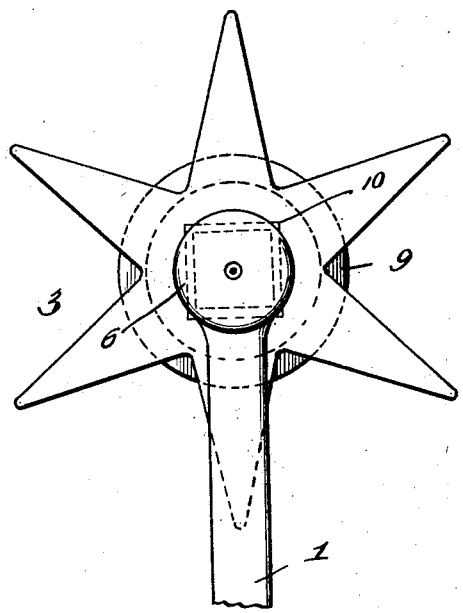
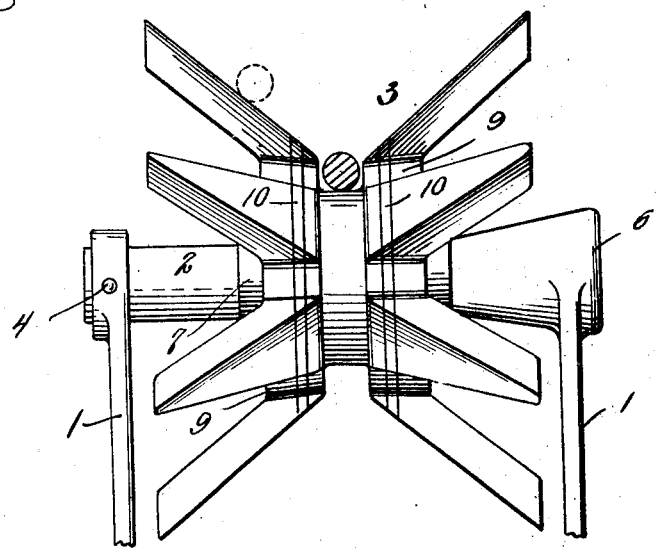
S. D. Master,
INVENTOR
BY Victor J. Evans.
ATTORNEY
WITNESSES:

UNITED STATES PATENT OFFICE.

SHAVERKSHA D. MASTER, OF BOMBAY, INDIA.

TROLLEY-WHEEL.

1,385,881. Specification of Letters Patent. Patented July 26, 1921.

Application filed July 2, 1920, Serial No. 393,771. Renewed June 10, 1921. Serial No. 476,608.

*To all whom it may concern:*

Be it known that I, SHAVERKSHA D. MASTER, a subject of the King of Great Britain, residing at Bombay, India, have invented new and useful Improvements in Trolley-Wheels, of which the following is a specification.

This invention relates to improvements in trolley wheels, the principal object of the invention being to provide means for preventing the wheel from leaving the trolley wire and facilitating its passage by cross wires.

Another object of the invention is to make the replacing means in the form of star-shaped wheels which are rotatably mounted upon the trolley wheel and are insulated therefrom.

This invention also consists in certain other features of construction and in the combination and arrangement of the several parts, to be hereinafter fully described, illustrated in the accompanying drawings and specifically pointed out in the appended claim.

In describing my invention in detail reference will be had to the accompanying drawings wherein like characters denote like or corresponding parts throughout the several views, and in which:—

Figure 1 is a sectional view of the invention.

Fig. 2 is a side view thereof.

Fig. 3 is a section through one of the spokes of one of the wheels.

Fig. 4 is a front view showing the way the wheel positions itself on the wire.

In these drawings 1 indicates the forks, carried by the trolley pole and 2 indicates the axle of the trolley wheel 3. As shown the axle is secured by a pin 4 in a hole in one fork, and has its reduced end fitting in a socket 5 formed in a rightangular enlargement 6 formed on the other fork. The hub of the wheel 3 is engaged by the shoulder 7 on the axle and the inner end of said enlargement 6. An annular recess 8 is formed on each side of the trolley wheel and the hubs 9 of the replacer wheels engage these recesses and are held therein by the shoulder 7 and the part 6. These replacer wheels are of star-shape with their spokes inclining outwardly so as to leave an annular space between them of substantially conical shape in cross section. Thus the wheel will be easily replaced on the wire by the inclined faces of said wheels and said wheels will prevent the wheel leaving the wire through accident or jerks. When the wheel strikes a cross trolley wire the replacer wheels will be rotated by the arm striking said cross wire so as to facilitate the passage of the trolley wheel across the same. This action is facilitated by reason of the fact that the wheels may have independent rotation on the trolley wheel. I may insulate the replacer wheels from the trolley wheel by placing insulating material 10 in the recesses 8.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with a trolley harp, a wheel having annular recesses in its sides, a pair of star-shaped replacer wheels having their hubs engaging said recesses, the spokes of the wheels inclining outwardly, an axle for supporting the trolley wheel and shoulders formed on the axle and harp for holding the replacer wheels on the trolley wheel.

In testimony whereof I affix my signature.

SHAVERKSHA D. MASTER.